(12) United States Patent
Mueck et al.

(10) Patent No.: US 11,076,424 B2
(45) Date of Patent: Jul. 27, 2021

(54) TXOP WITH CONTINUED LBT AFTER A PAUSE

(71) Applicant: Apple Inc., Cupertino, CA (US)

(72) Inventors: Markus Dominik Mueck, Unterhaching (DE); Biljana Badic, Munich (DE); Zhibin Yu, Unterhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/489,722

(22) PCT Filed: Sep. 12, 2017

(86) PCT No.: PCT/US2017/051080
§ 371 (c)(1),
(2) Date: Aug. 29, 2019

(87) PCT Pub. No.: WO2018/160219
PCT Pub. Date: Sep. 7, 2018

(65) Prior Publication Data
US 2020/0245355 A1 Jul. 30, 2020

Related U.S. Application Data

(60) Provisional application No. 62/465,602, filed on Mar. 1, 2017.

(51) Int. Cl.
*H04W 74/08* (2009.01)
*H04L 27/26* (2006.01)
(Continued)

(52) U.S. Cl.
CPC ..... *H04W 74/0808* (2013.01); *H04L 27/2678* (2013.01); *H04M 7/006* (2013.01); *H04W 16/14* (2013.01)

(58) Field of Classification Search
CPC .............. H04W 74/0808; H04W 16/14; H04L 27/2678; H04M 7/006
(Continued)

(56) References Cited

U.S. PATENT DOCUMENTS

2013/0163575 A1* 6/2013 Pak ................... H04W 74/0808
370/338
2016/0066349 A1 3/2016 Seok
(Continued)

FOREIGN PATENT DOCUMENTS

| WO | WO-2014190284 A1 | 11/2014 |
| WO | WO-2016068668 A2 | 5/2016 |
| WO | WO-2018460219 A1 | 9/2018 |

OTHER PUBLICATIONS

Tao et al; Enhanced LBT Algorithm for LTE-LAA in Unlicensed Band; IEEE, 2016. (Year: 2016).*
(Continued)

*Primary Examiner* — Christopher R Crompton
(74) *Attorney, Agent, or Firm* — Kowert, Hood, Munyon, Rankin & Goetzel, P.C.

(57) ABSTRACT

Devices and methods of transmit opportunity (TXOP) with continued listen-before-talk (LBT) are generally described. A user equipment (UE) can be configured to perform a single LBT during an LBT scanning instance, to detect availability of an unlicensed wireless channel. Upon detecting availability of the channel, data is encoded for transmission during a TXOP with a TXOP duration. A pause in the transmission of the data is initiated upon expiration of a first time interval of the TXOP. A continuous LBT procedure is performed upon expiration of the pause, to determine a plurality of sensing metrics indicating occupancy of the unlicensed wireless channel. The transmission of the data is resumed during the TXOP for a second time interval, when at least one sensing (Continued)

metric of the plurality of sensing metrics is below a threshold.

25 Claims, 18 Drawing Sheets

(51) Int. Cl.
*H04M 7/00* (2006.01)
*H04W 16/14* (2009.01)

(58) Field of Classification Search
USPC .......................................................... 370/329
See application file for complete search history.

(56) References Cited

U.S. PATENT DOCUMENTS

| | | | |
|---|---|---|---|
| 2016/0227425 A1 | 8/2016 | Kim et al. | |
| 2018/0063736 A1* | 3/2018 | Sadeghi | H04W 24/10 |
| 2018/0199376 A1* | 7/2018 | Kim | H04L 1/0001 |
| 2019/0150170 A1* | 5/2019 | Park | H04W 72/1268 |
| | | | 370/329 |
| 2019/0274054 A1* | 9/2019 | Salem | H04L 12/189 |
| 2020/0245354 A1* | 7/2020 | Kazmi | H04W 56/0045 |
| 2020/0337086 A1* | 10/2020 | Park | H04W 72/0446 |

OTHER PUBLICATIONS

"International Application Serial No. PCT/US2017/051080, International Search Report dated Jan. 3, 2018", 5 pgs.

"International Application Serial No. PCT/US2017/051080, Written Opinion dated Jan. 3, 2018", 11 pgs.

Intel Corporation; "en 301 893: TxOP with pause—Discussion on Testing for compliance with technical equirements", IEEE Draft; vol. 802.11 ETSI BRAN; Piscataway, NJ USA; Jun. 14, 2016, 8 Pages.

Qualcomm Incorporated; "Remaining details UL LBT"; 3GPP TSG RAN WG1 #86 r1-166255; Gothenburg, Sweden; Aug. 22, 2016; 8 Pages.

Extended European Search Report for Patent Application No. EP 17899173; dated Oct. 28, 2020; 9 pages.

Intel Corporation; "EN 301 893: TxOP with pause—Discussion on Testing for compliance with technical requirements", IEEE Draft; vol. 802.11 ETSI BRAN; Piscataway, NJ USA; Jun. 14, 2016, 8 Pages.

Qualcomm Incorporated; "Remaining details UL LBT"; 3GPP TSG RAN WG1 #86 R1-166255; Gothenburg, Sweden; Aug. 21, 2016; 8 Pages.

* cited by examiner

TXOP WITH CONTINUED LBT AFTER A PAUSE

PRIORITY CLAIM

This application is a U.S. National Stage Filing under 35 U.S.C. 371 from International Application No. PCT/US2017/051080, filed on Sep. 12, 2017, published as WO 2018/160219, which claims the benefit of priority to U.S. Provisional Patent Application Ser. No. 62/465,602, filed Mar. 1, 2017, and entitled "TRANSMIT OPPORTUNITY (TXOP) WITH CONTINUED LISTEN-BEFORE-TALK (LIST) AFTER PAUSE," each of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to transmit opportunity (TXOP) with continued listen-before-talk (LBT) after a pause.

BACKGROUND

With the increase in different types of devices communicating with various network devices, usage of 3GPP LTE systems has increased. The penetration of mobile devices (user equipment or UEs) in modern society has continued to drive demand for a wide variety of networked devices in a number of disparate environments. The use of networked UEs using 3GPP LTE systems has increased in all areas of home and work life. Fifth generation (5G) wireless systems are forthcoming, and are expected to enable even greater speed, connectivity, and usability.

LTE and LTE-Advanced are standards for wireless communications of high-speed data for user equipment (UE) such as mobile telephones. In LTE-Advanced and various wireless systems, carrier aggregation is a technology where multiple carrier signals operating on different frequencies may be used to carry communications for a single UE, thus increasing the bandwidth available to a single device. In some aspects, carrier aggregation may be used where one or more component carriers operate on unlicensed frequencies.

The explosive wireless traffic growth leads to a need of rate improvement. With mature physical layer techniques, further improvement in the spectral efficiency will be marginal. On the other hand, the scarcity of licensed spectrum in low frequency bands results in a deficit in the data rate boost. Thus, there are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of DL operation on unlicensed spectrum via CA, while Rel-14 enhanced LAA (eLAA) system focuses on the design of UL operation on unlicensed spectrum via CA. Further enhanced operation of LTE systems in the unlicensed spectrum is expected in future releases and 5G systems. Potential LTE operation in the unlicensed spectrum includes (and is not limited to) the LTE operation in the unlicensed spectrum via dual connectivity (DC), or DC-based LAA, and the standalone LTE system in the unlicensed spectrum, where LTE-based technology solely operates in unlicensed spectrum without requiring an "anchor" in the licensed spectrum, called MulteFire. MulteFire, combines the performance benefits of LTE technology with the simplicity of Wi-Fi-like deployments, is envisioned as a significantly important technology component to meet the ever-increasing wireless traffic.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
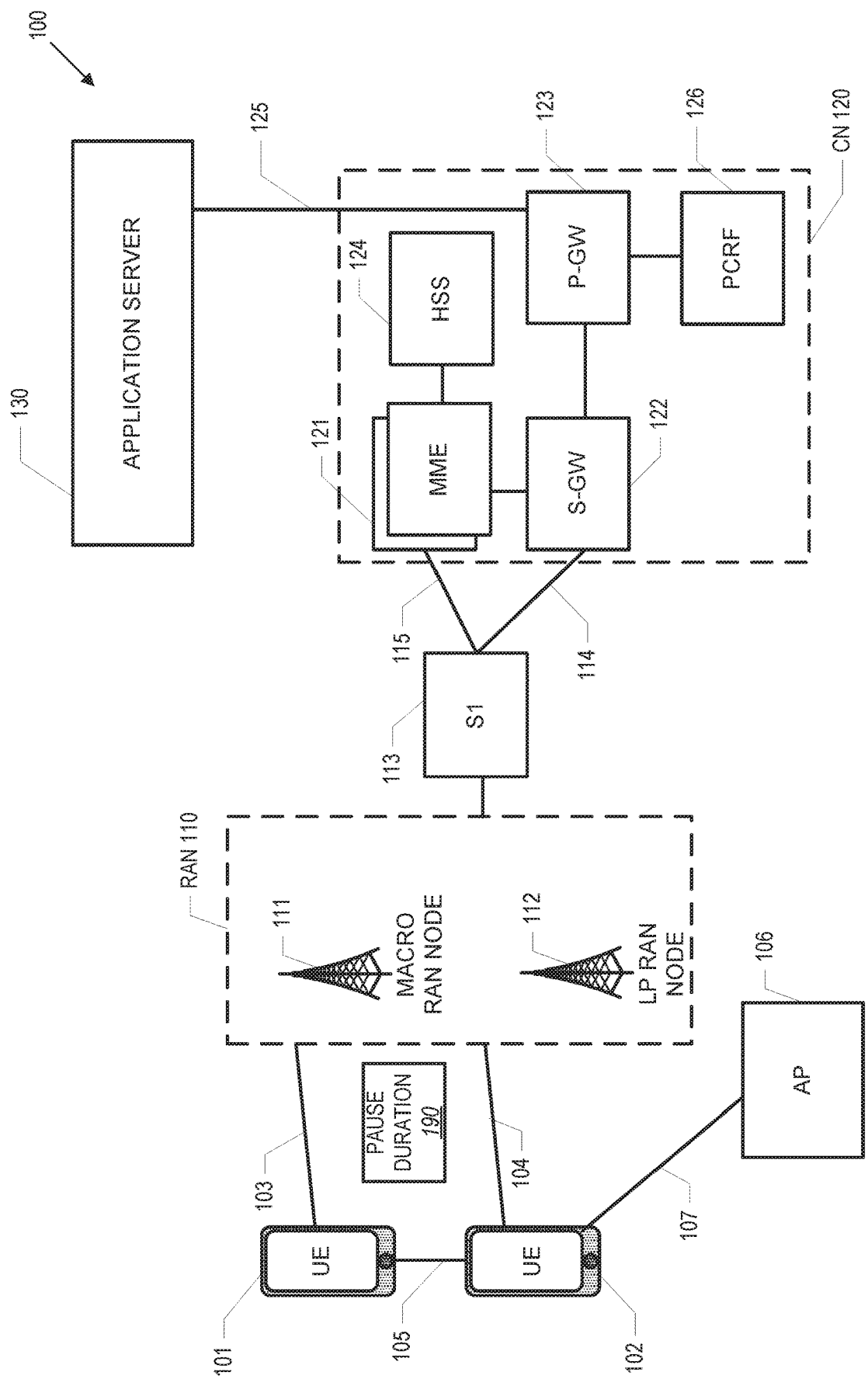
FIG. 1A illustrates an architecture of a network in accordance with some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

As used herein, the term "TXOP" can indicate a transmission opportunity in wireless networks supporting an IEEE Quality of Service standard (e.g., the IEEE 802.11e Quality of Service standard). The TXOP can be used to indicate a bounded time interval, during which stations supporting Quality of Service are permitted to transfer a series of frames. As used herein, the term "TXOP" can be used to indicate a transmission opportunity associated with one or more wireless devices operating under one or more wireless protocols, using one or more different types of wireless communication links (e.g., one or more of the wireless communication link types as mentioned herein above). Beyond the IEEE 802.11e context, the term "TXOP" can be used to indicate any allowed transmission duration for a series of frames or any other series of transmissions.

FIG. 1A illustrates an architecture of a network in accordance with some aspects. The network 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some aspects, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB) or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this aspect, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101/102 (e.g., dynamically) an antenna panel selection and a receive (Rx) beam selection that should be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101/102 (e.g., dynamically) an antenna panel selection and a transmit (Tx) beam selection that should be used by the UE for data transmission on a physical uplink shared channel (PUSCH) as well as for sounding reference signal (SRS) transmission.

In accordance with some aspects, the UEs 101 and 102, the eNBs 111 and 112, and the AP 106 can be configured to operate in a LAA, eLAA, MulteFire or another communication environment using licensed and/or unlicensed spectrum (e.g., the 5 GHz Industrial, Scientific and Medical (ISM) band). In some aspects, a wireless device (e.g., a UE, eNB, an AP, or another type wireless device) can use different size transmit opportunity (TXOP) frames. For example, some wireless devices can use 6 ms TXOP frames in Wi-Fi networks, and 8 ms TXOP frames in LAA/Multe-Fire networks.

In some aspects, a pause can be introduced in longer TXOP frames (e.g., frames longer than 8 ms) communicated in a licensed or unlicensed wireless channel in order to allow intervening communication systems (e.g., third party voice over Internet protocol (VoIP) systems) to grasp the channel. In instances when intervening device grasps the channel after the pause, the original TXOP user loses the channel, even if the transmission of the intervening device does not consume all of the remaining TXOP time. In some aspects when intervening device initiates transmission after a TXOP pause, communication resources can be used more efficiently by allowing the original TXOP user to re-take the channel after the intervening device transmission grasping the channel during the TXOP pause.

Figure 1B:
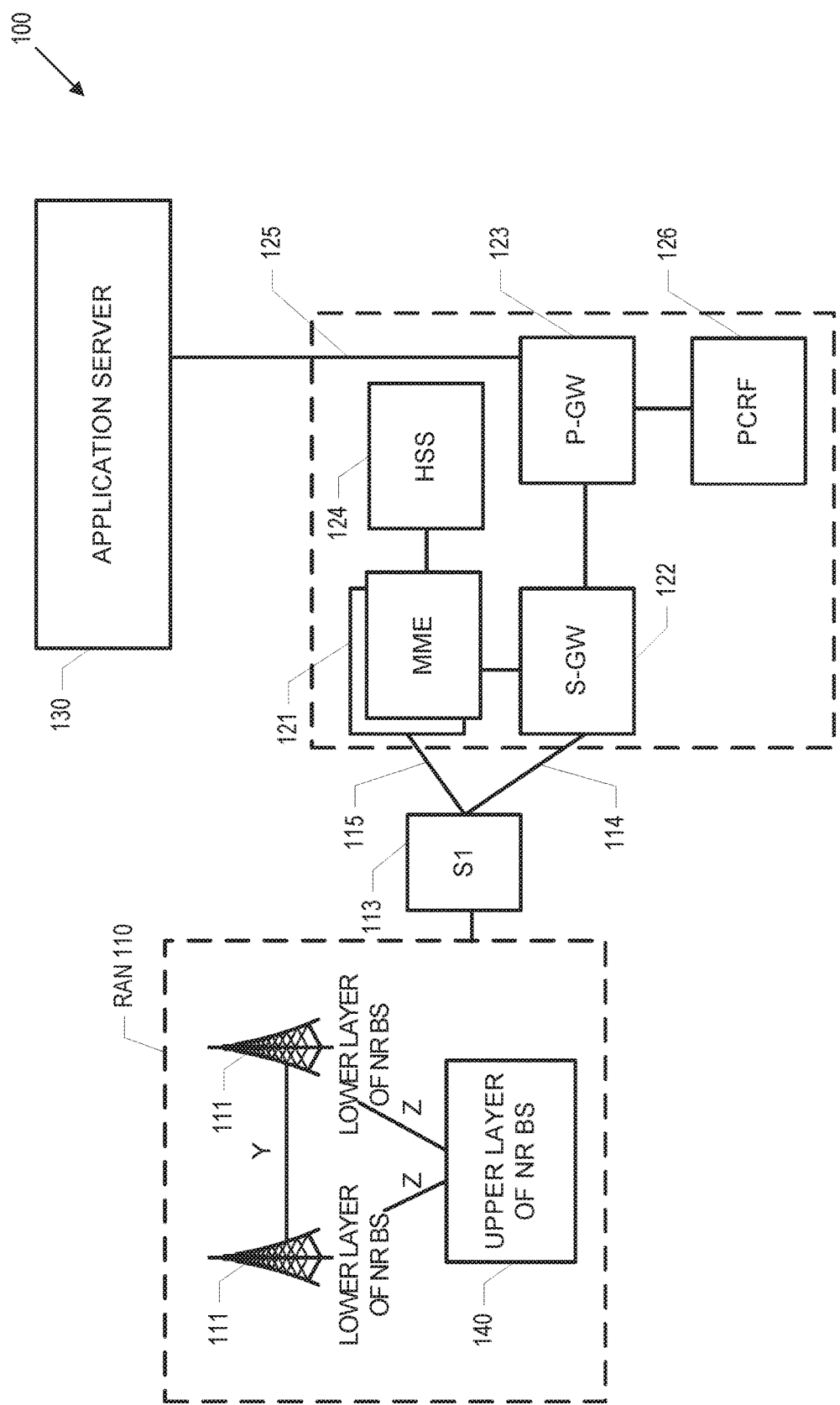
FIG. 1B is a simplified diagram of a next generation wireless network in accordance with some aspects.

In some aspects, the pause duration 190 can be configured by one or more of the UEs, eNBs, and AP within the communication network 100. The device the pause duration 190 can communicate such duration to other devices within the communication system 100. In some aspects, the pause duration 190 can be configured by higher layers within the communication system 100. In some aspects, the pause duration 190 can be configured dynamically, based on network traffic and/or other characteristics of the vacation system 100. For FIG. 1B is a simplified diagram of a next generation wireless network in accordance with some aspects. The wireless network may be similar to that shown in FIG. 1A but may contain components associated with a 5G network. The wireless network may contain, among other elements not shown, a RAN 110 coupled to the core network 120 (as well as to the Internet which can connect the core network 120 with other core networks 120). In some aspects, the RAN 110 and the core network 120 may be a next generation (5G) 3GPP RAN and 5G core network, respectively. The RAN 110 may include an upper layer of a new generation node-B (gNB) (also referred to as a new radio (NR) base station (BS) (ULNRBS)) 140 and multiple lower layers of different gNBs (NR BS (LLNRBS)) 111. The LLNRBSs 111 can be connected to the ULNRBS 140 via a Z interface. The Z interface can be open or proprietary. In some examples, the LLNRBS 111 can be referred to as a transmission-reception point (TRP). If the Z interface is proprietary, then the ULNRBS 140 and the LLNRBS 111 may be provided by the same vendor. The LLNRBS 111 can be connected by a Y interface, which may be equivalent to the LTE X2 interface. The ULNRBS 140 may be connected to the core network 120 through the S1 interface 113.

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. Aspects described herein may be implemented into a system using any suitably configured hardware or software.

Figure 2:
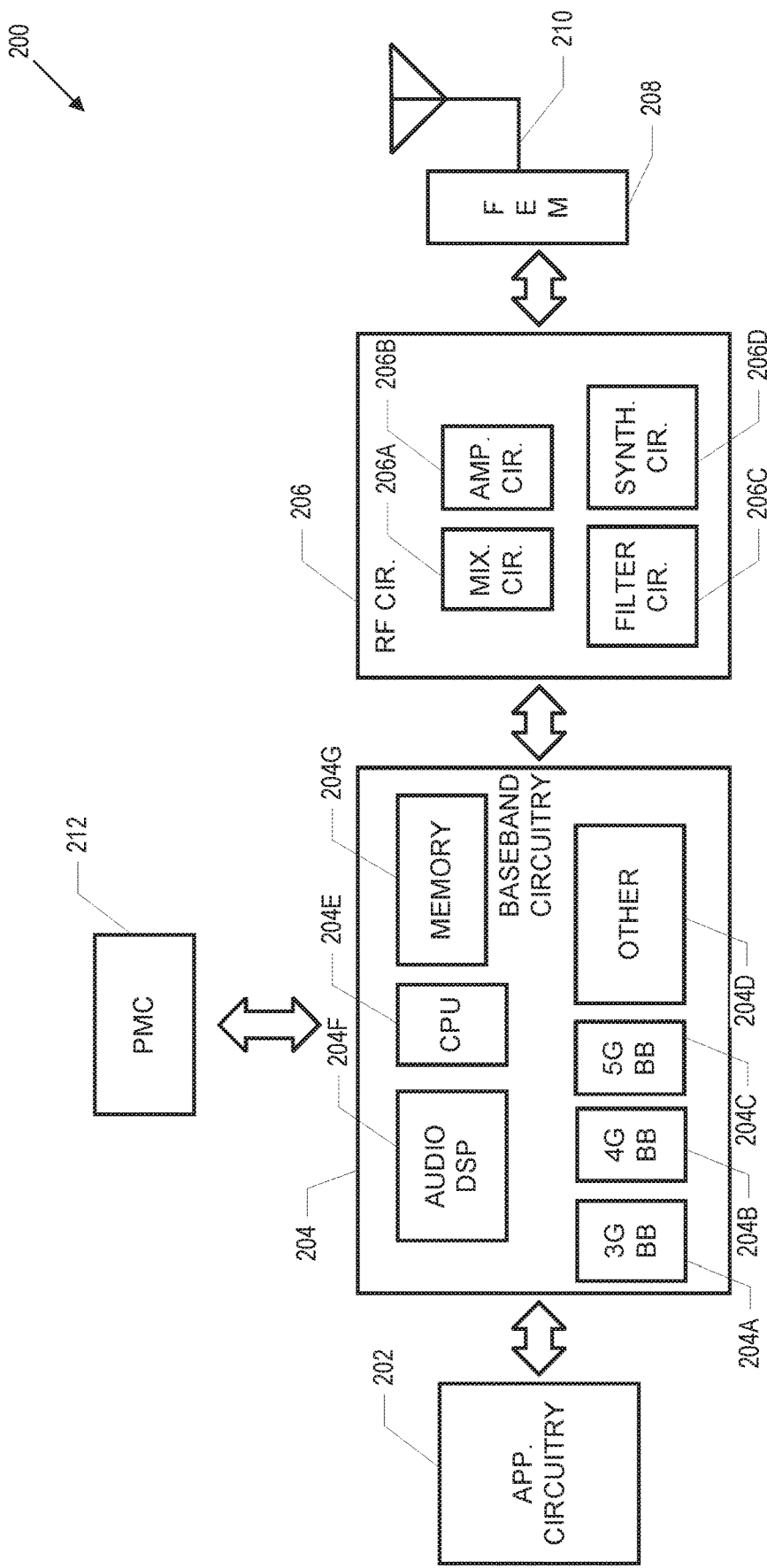
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include less elements (e.g., a RAN node may not utilize application circuitry 202, and instead include a processor/controller to process IP data received from an EPC). In some aspects, the device 200 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/demapping functionality. In some aspects, encoding/decoding circuitry of the baseband circuitry 204 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include mixer circuitry 206A, amplifier circuitry 206B and filter circuitry 206C. In some aspects, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some aspects, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may be zero-frequency baseband signals, although this is not a requirement. In some aspects, mixer circuitry 206A of the receive signal path may comprise passive mixers, although the scope of the aspects is not limited in this respect.

In some aspects, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some aspects, the mixer circuitry 206A of the receive signal path and the mixer circuitry 206A of the transmit signal path may include two or more mixers and may be arranged for quadrature downconversion and upconversion, respectively. In some aspects, the mixer circuitry 206A of the receive signal path and the mixer circuitry 206A of the transmit signal path may include two or more mixers and may be arranged for image rejection (e.g., Hartley image rejection). In some aspects, the mixer circuitry 206A of the receive signal path and the mixer circuitry 206A may be arranged for direct downconversion and direct upconversion, respectively. In some aspects, the mixer circuitry 206A of the receive signal path and the mixer circuitry 206A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may be provided for processing signals for each spectrum, although the scope of the aspects is not limited in this respect.

In some aspects, the synthesizer circuitry 206D may be a fractional-N synthesizer or a fractional N/N+1 synthesizer, although the scope of the aspects is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some aspects, the synthesizer circuitry 206D may be a fractional N/N+1 synthesizer.

In some aspects, frequency input may be provided by a voltage controlled oscillator (VCO), although that is not a requirement. Divider control input may be provided by either the baseband circuitry 204 or the applications processor 202 depending on the desired output frequency. In some aspects, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done solely in the RF circuitry 206, solely in the FEM 208, or in both the RF circuitry 206 and the FEM 208.

In some aspects, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may transition back to RRC_Connected state in order to receive data.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
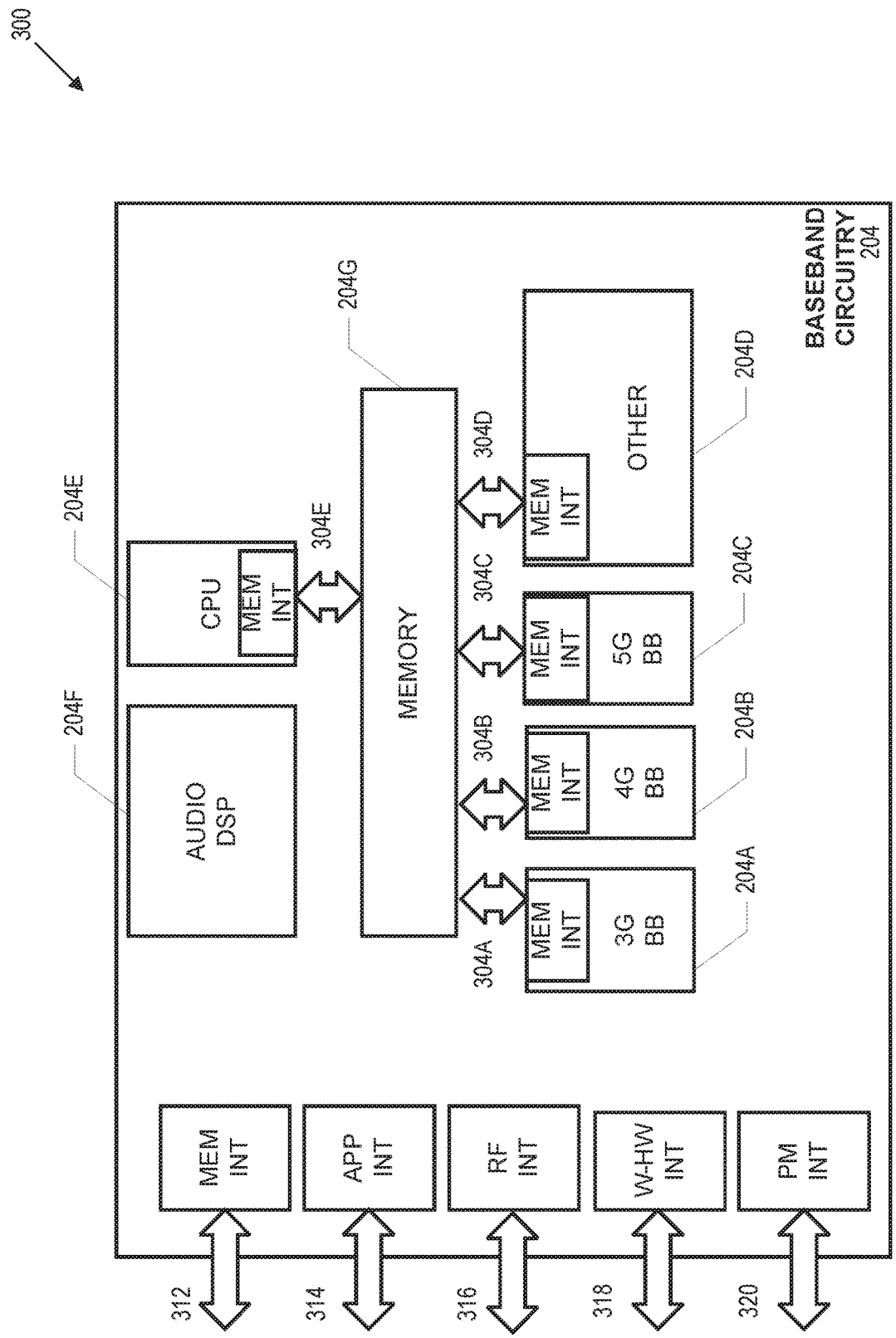
FIG. 3 illustrates example interfaces of baseband circuitry in accordance with some aspects.

FIG. 3 illustrates example interfaces of baseband circuitry in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
FIG. 4 is an illustration of a control plane protocol stack in accordance with some aspects.

FIG. 4 is an illustration of a control plane protocol stack in accordance with some aspects. In this aspect, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIMI), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
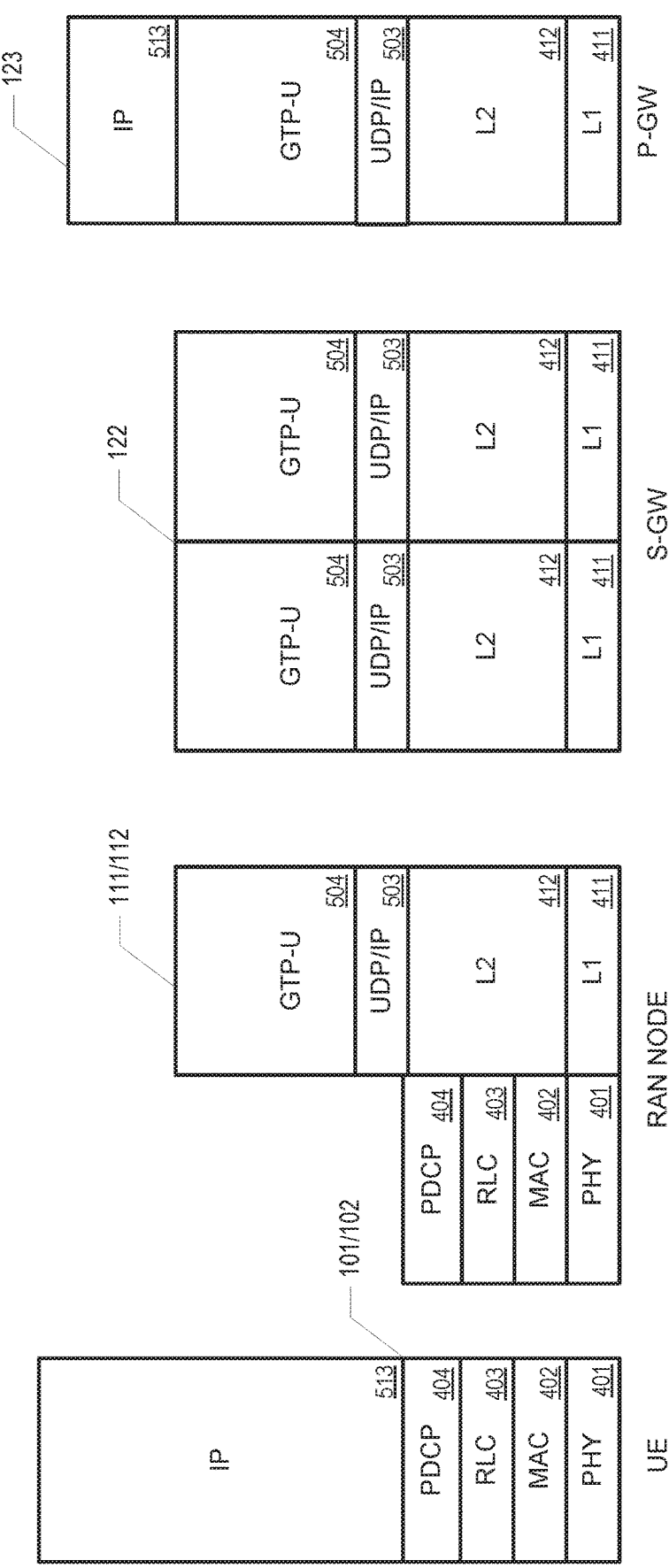
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
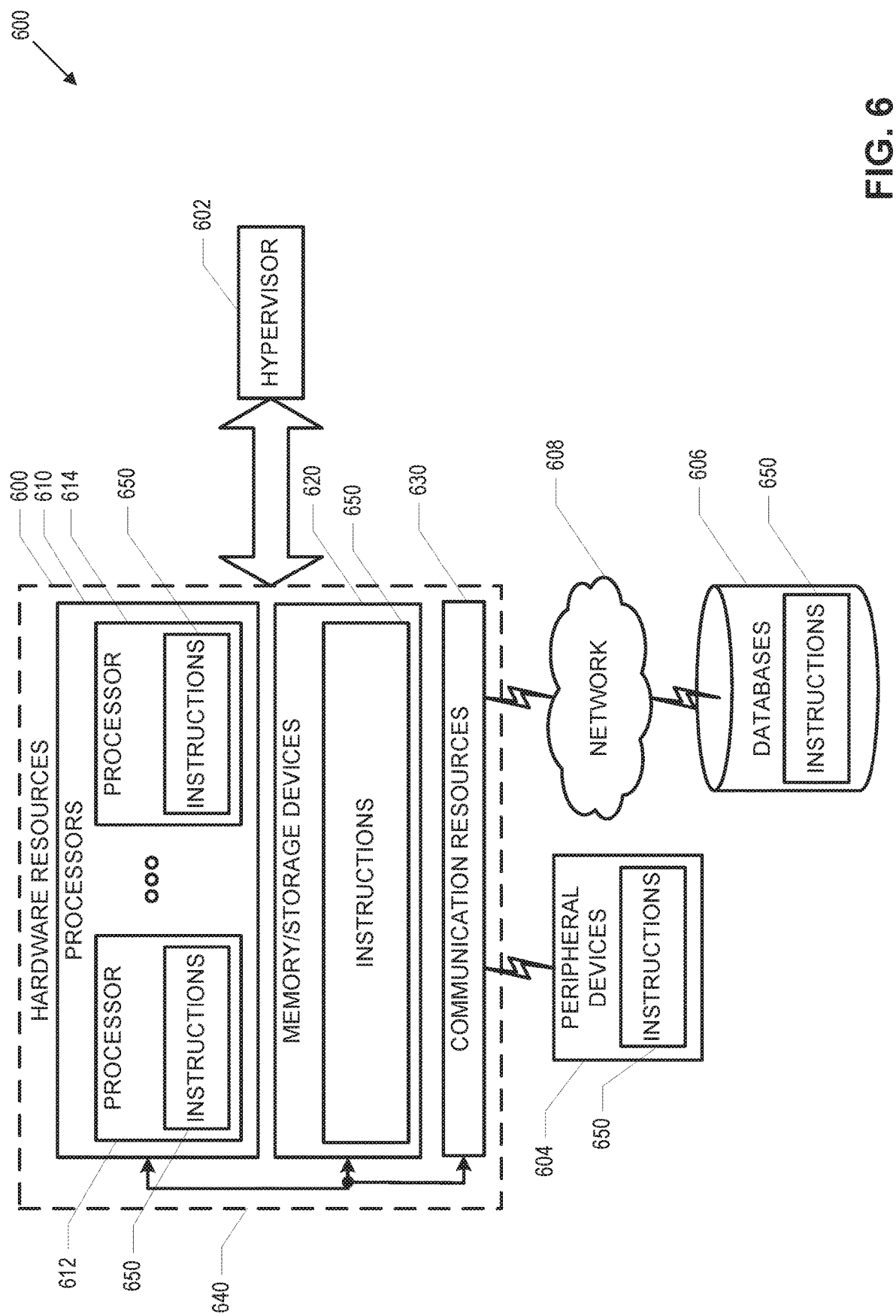
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/ storage devices 620, and one or more communication resources 630, each of which may be communicatively coupled via a bus 640. For aspects where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
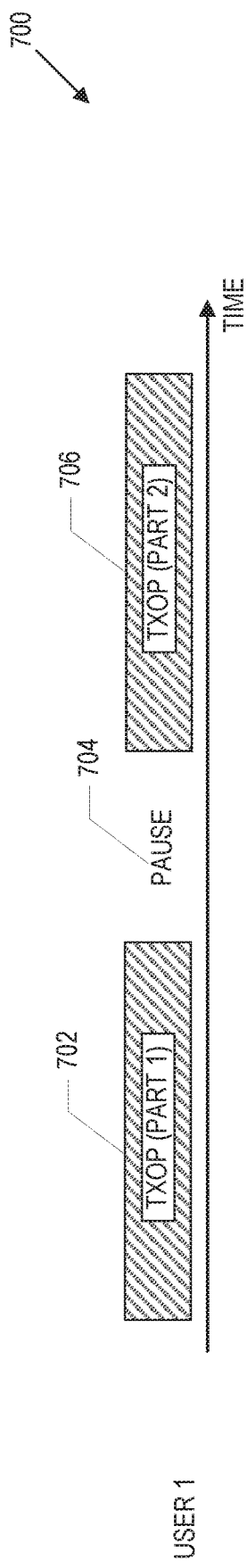
FIG. 7 illustrates an example of a transmission opportunity (TXOP) with a pause in accordance with some aspects.

FIG. 7 illustrates an example of a transmission opportunity (TXOP) with a pause in accordance with some aspects. Referring to FIG. 7, diagram 700 illustrates a TXOP separated by pause 704. More specifically, a pause 704 separates the TXOP into a first part 702 and a second part 706.

Figure 8:
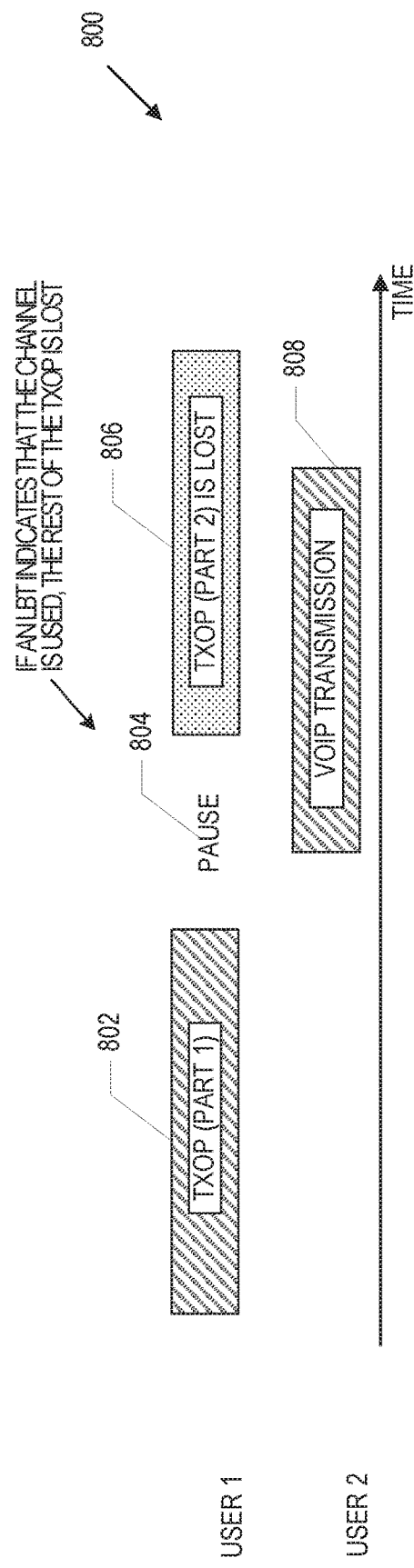
FIG. 8 illustrates an example of a TXOP with a pause and an intervening transmission in accordance with some aspects.

FIG. 8 illustrates an example of a TXOP with a pause and an intervening transmission in accordance with some aspects. Referring to FIG. 8, diagram 800 illustrates a TXOP separated by pause 804, with an intervening transmission taking place after the pause is initiated. More specifically, a first wireless device can transmit data during a first portion 802 of a TXOP. After the pause 804 is initiated, an intervening transmission 808 of a second wireless device takes place. The intervening transmission 808 can be a VoIP transmission. In this regard, a remaining (second) portion 806 of the TXOP of the first wireless device is lost, regardless of how long the second wireless device transmits after the pause has started.

Figure 9:
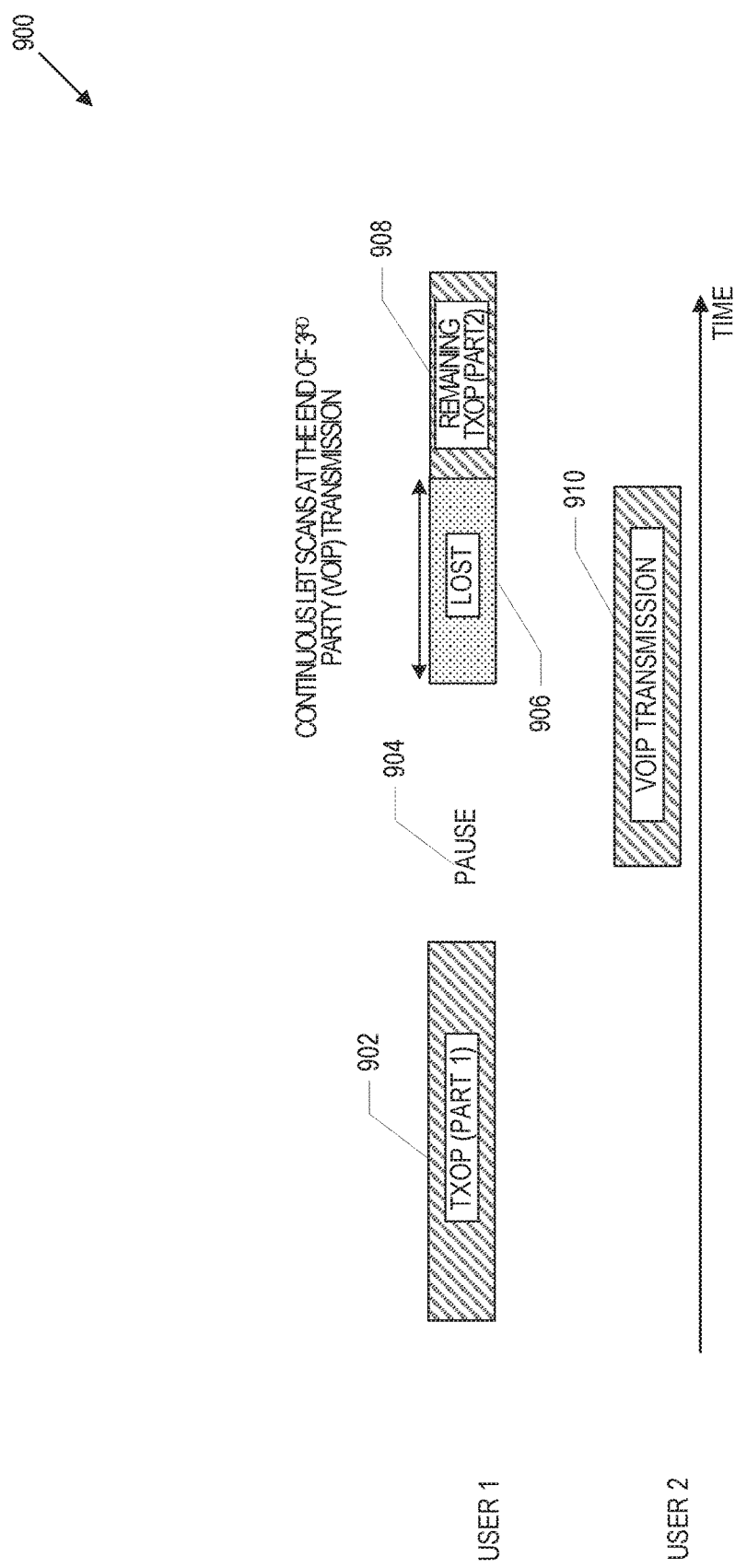
FIG. 9 illustrates an example of a TXOP with a pause, an intervening transmission, and continuation of the TXOP after a continuous listen-before-talk (LBT) procedure in accordance with some aspects.

FIG. 9 illustrates an example of a TXOP with a pause, an intervening transmission, and continuation of the TXOP after a continuous listen-before-talk (LBT) procedure in accordance with some aspects. Referring to FIG. 9, diagram 900 illustrates a TXOP separated by pause with an intervening transmission and a continuous LBT in order to resume data transmission for a remainder of the TXOP. More specifically, a first wireless device can transmit data during a first portion 902 of a TXOP. After the pause 904 is initiated an intervening transmission 910 of a second wireless device takes place.

In some aspects, a continuous LBT procedure can be introduced after the end of the TXOP pause. This allows the first wireless device to identify when other devices do not use the channel anymore, and then the original TXOP user (i.e. the first wireless device) can resume data transmission for the remaining TXOP duration. In reference to FIG. 9, during the time interval 906 (or a portion thereof), the first wireless device can perform a continuous LBT to assess availability of the wireless channel. Various functionalities associated with different types of continuous LBT are discussed herein below. Based on the continuous LBT and continuous assessment of the channel availability, the first wireless device can detect a completion of the intervening transmission 910, and resume data transmission for a remaining portion 908 of the TXOP. In this regard, the original TXOP user (i.e., the first wireless device) can reuse the wireless channel based on the original TXOP after the intervening transmission 910 has completed, which improves the efficiency and optimizes the spectrum utilization.

In some aspects, the TXOP duration (i.e., the duration of TXOP parts 902 and 908) can be 8 ms. In some aspects, a duration of TXOP part 902 can be at most 6 ms. In some aspects, a duration of the pause 904 can be 100 µs or more. In some aspects, other pause durations can be used or additional pause parameters can be introduced, e.g., mandated for specific TXOP time (e.g., 100 µs pause for 8 ms TXOP, 200 µs pause for 10 ms TXOP, or any other configuration).

In some aspects, the following steps can be performed for using a remainder of a TXOP after a pause and a continuous LBT. More specifically, as an initial step, a single LBT can be performed by a first wireless device. The single LBT can be performed by scanning the wireless channel to generate a sensing metric during a single LBT instance (i.e. a single time interval). The sensing metric can include a received signal strength indicator (RS SI) or CP autocorrelation metric, or any other metric indicative of channel occupancy. If the wireless channel is unoccupied to, the first wireless device can initiate a transmission during a first portion of a TXOP, prior to a TXOP pause. The first wireless device can wait for the end of the pause to continue transmitting data for the remainder of the TXOP.

During an example second processing step, the first wireless device can go idle after the first portion of the TXOP, for the duration of the pause (i.e., 100 µs or more).

During an example third processing step, a continuous LBT can be performed by the first wireless device at the end of the pause. More specifically, once the TXOP pause is finished, the first wireless device can initiate a continuous LBT scan process to check for the presence of an incumbent user that might be utilizing the same band. In comparison to the single LBT where a single sensing metric is measured, multiple sensing metrics can be measured during the continuous LBT. More specifically, the wireless device initiating the continuous LBT can be configured to periodically measure a sensing metric to monitor the occupancy of the wireless channel.

Figure 10A:
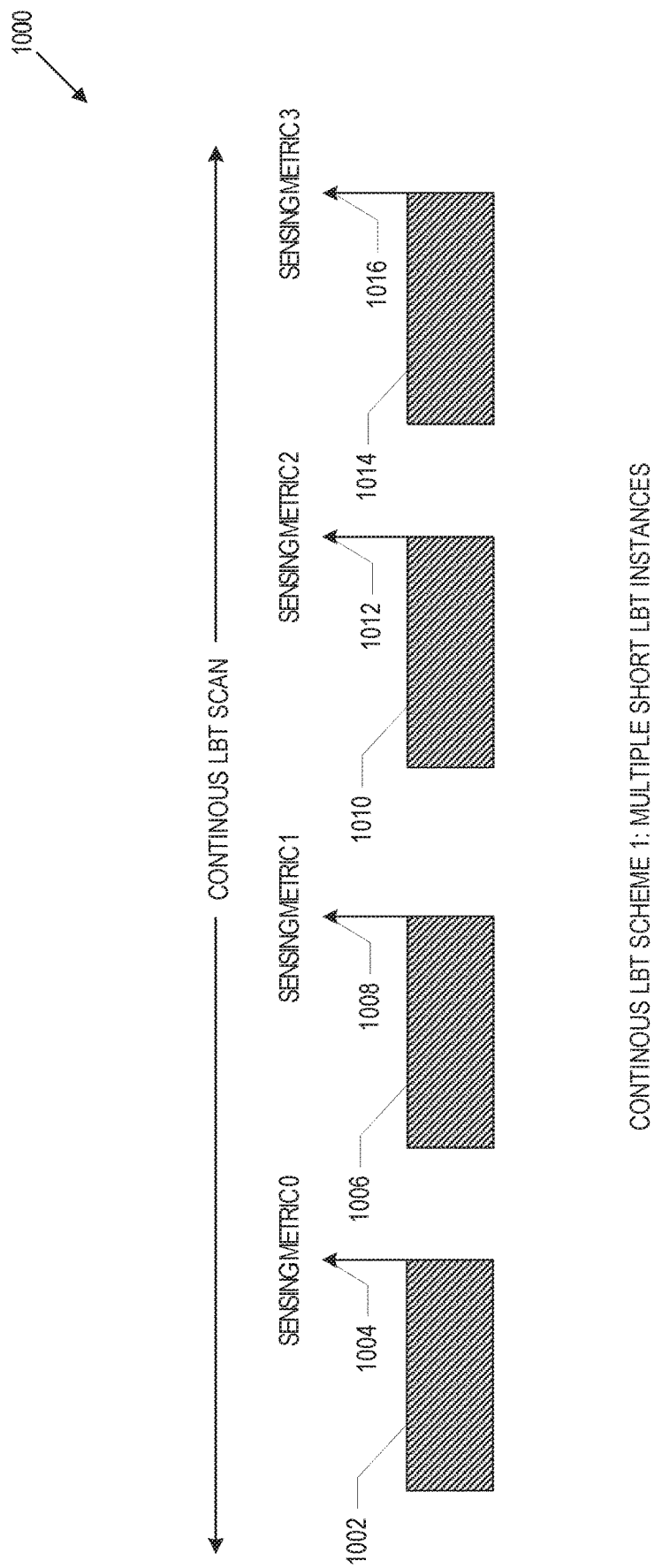
FIG. 10A illustrates a first continuous LBT scheme in accordance with some aspects.
Figure 10B:
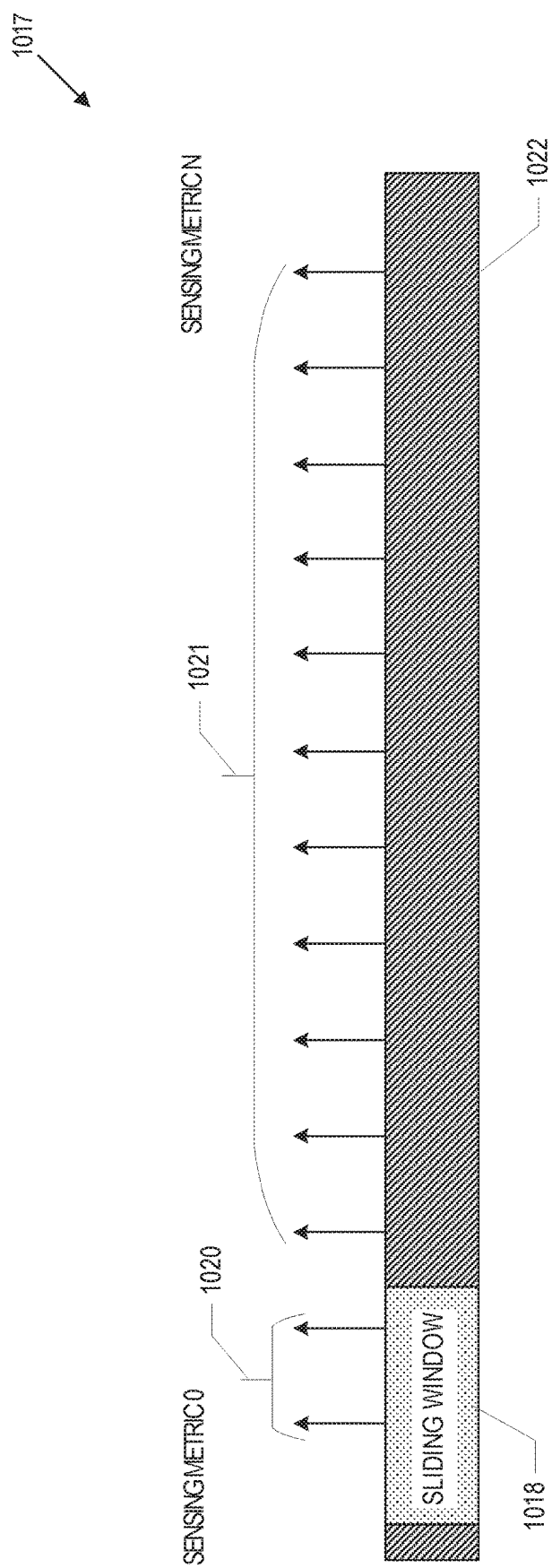
FIG. 10B illustrates a second continuous LBT scheme in accordance with some aspects.

In some aspects, the continuous LBT scan process can be implemented either by periodically allocating multiple independent short LBT instances over a long period (e.g., as illustrated in FIG. 10A) or by allocating a long LBT instance which periodically generates the sensing metrics over a time sliding window (e.g., as illustrated in FIG. 10B).

For each of the LBT instances, in instances when the intervening (second) wireless device modulation scheme is unknown to the first wireless device, an energy level scan can be performed in order to determine whether the channel is occupied or not, i.e. a received signal strength indicator (RSSI) measurement in time domain can be used as a sensing metric. In instances when the second wireless device modulation scheme is pre-known to the first wireless device (e.g., through high layer signaling), then more advanced spectrum sensing algorithms can be applied. For example, if the first wireless device is aware that the second wireless device generates OFDM-modulated signals, then the first wireless device can apply autocorrelation based on cyclic prefix (CP) with its duplicated part to gain better sensing performance.

During an example fourth processing step, the first wireless device can continuously apply a constant threshold for each measured sensing metric (e.g., RSSI or CP auto correlation metric) to identify a collision with an ongoing transmissions. In some aspects, it is also feasible to combine several sensing metrics during the continuous LBT process to increase the robustness of channel occupancy detection. For example, voting over subsequent sensing metrics from a sliding window or the delta with the previous sensing metric instead of an absolute metric. During an example fifth processing step, once the desired threshold is achieved, the first user can resume data transmission for the remainder of the assigned TXOP period.

In some aspects, other types of LBT procedures can be applied in lieu of the continuous LBT procedure described herein. For example, LBT can be applied not continuously and with (short) interruptions. In some aspects, the continuous LBT can be initiated with a delay (i.e., continuous LBT can be triggered after a delay and at a future time when the secondary transmission is expected to conclude). In this case, at least one LBT can be used at the end of the pause in order to determine whether a secondary transmission is ongoing. In some aspects, the PBT procedure can be applied with interruptions. The interruptions may get shorter (or longer) with the elapsed time in order to ensure detection of the end or the secondary transmission (or identify that no secondary transmission occurs). In any of the above mentioned LBT procedures, the LBT may be a "full LBT" or a simplified/shortened LBT.

FIG. 10A illustrates a first continuous LBT scheme 1000 in accordance with some aspects. Referring to FIG. 10A, the continuous LBT scheme 1000 can include multiple LBT scanning instances 1002, 1006, 1010, and 1014. During each individual LBT scanning instance, receiver circuitry for the LBT initiating device can be turned ON for the duration of the scanning instance. Additionally, a sensing metric can be measured during each of the LBT scanning instances. For example, sensing metrics 1004, 1008, 1012, and 1016 can be measured during LBT scanning instances 1002, 1006, 1010, and 1014, respectively. In some aspects, the discrete measurement instances 1002, 1006, 1010, and 1014 can be equally spaced or unequally spaced.

FIG. 10B illustrates a second continuous LBT scheme 1017 in accordance with some aspects. Referring to FIG. 10B, the continuous LBT scheme 1017 includes a single LBT scanning instance 1022. In comparison to the LBT scheme 1000 in FIG. 10A (where receiver circuitry for the scanning wireless device is ON for the duration of each scanning instance and OFF for time durations between instances), the LBT scheme 1017 in FIG. 10B uses a single LBT scanning instance 1022 with the receiver circuitry being ON for the entire duration of the instance 1022. Additionally, multiple sensing metrics 1020-1021 can be measured for the duration of the LBT scanning instance 1022.

In some aspects, a sliding window 1018 can be used and a combined sensing metric can be output based on the sensing metrics measured within the sliding window. In reference to FIG. 10B, a combined sensing metric can be generated using sensing metrics 1024 sliding window 1018. As the sliding window 1018 most of the right, a new combined sensing metric can be generated based on the sensing metrics located within a current position of the sliding window.

In some aspects, the pause duration (e.g., 190) can be pre-configured or dynamically adjusted in order to achieve optimal quality of service for LTE/MulteFire communication systems, achieve optimal VoIP performance, and/or optimal fairness when using licensed or unlicensed spectrum within a wireless communication system (e.g., Wi-Fi/LTE/MulteFire). In some aspects, the pause duration 190 can be adapted based on network traffic (or traffic load) or other characteristics, as explained herein below.

Figure 11:
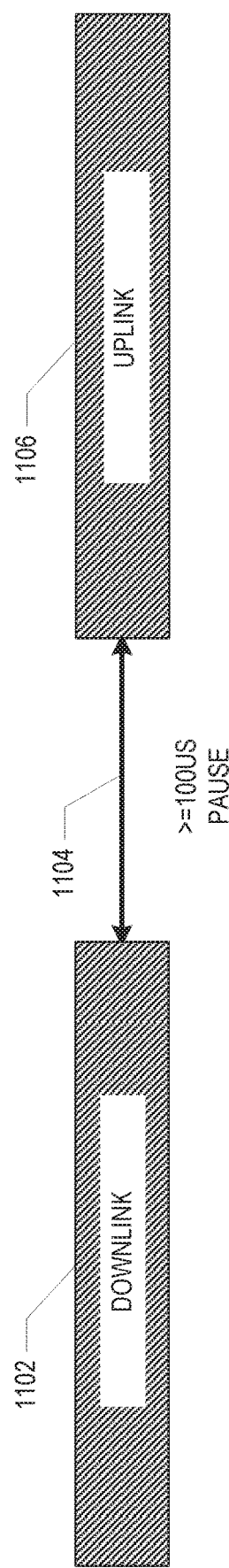
FIG. 11 illustrates example placement of a pause for uplink (UL) and downlink (DL) separation in accordance with some aspects.

FIG. 11 illustrates example placement of a pause for uplink (UL) and downlink (DL) separation in accordance with some aspects. Referring to FIG. 11, there is illustrated a downlink transmission 1102 and an uplink transmission 1106. In some aspects, the downlink and uplink transmissions can be separated by a pause 1104. In some aspects, the pause 1104 can be 100 µs or more.

Figure 12:
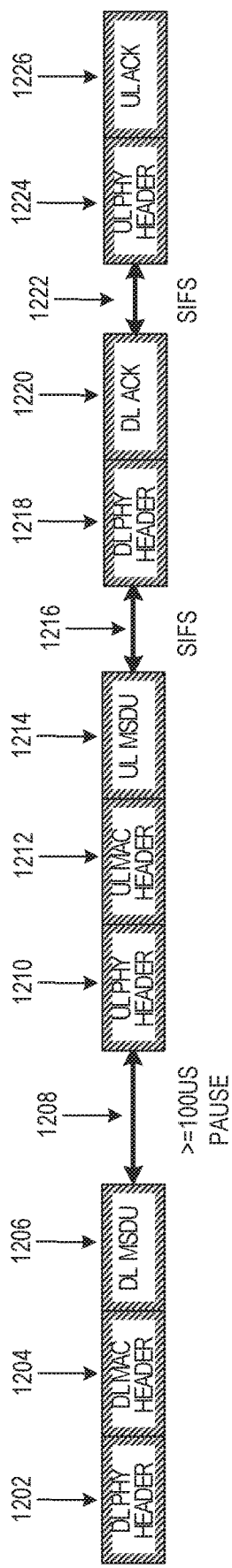
FIG. 12 illustrates example placement of a pause during 802.11 type communication exchange in accordance with some aspects.

FIG. 12 illustrates example placement of a pause during 802.11 type communication exchange in accordance with some aspects. Referring to FIG. 12, there is illustrated an example communication sequence in a Wi-Fi-based system. Initially, a downlink transmission can be performed, followed by a pause, an uplink transmission, downlink acknowledgment, and uplink acknowledgment. The downlink transmission can include a PHY header 1202, a MAC header 1204, and downlink data unit 1206. The downlink data transmission can be followed by a pause 1208, which can be at least 100 µs. Following the pause 1208, the uplink transmission can include a PHY header 1210, a MAC header 1212, and an uplink data unit 1214. The uplink transmission can be followed by a short inter-frame space (SIFS) 1216 and a downlink acknowledgment 1220 preceded by a PHY header 1218. The downlink acknowledgment 1220 can be followed by another SIFS 1222, an uplink PHY header 1224, and an uplink acknowledgment 1226.

Figure 13:
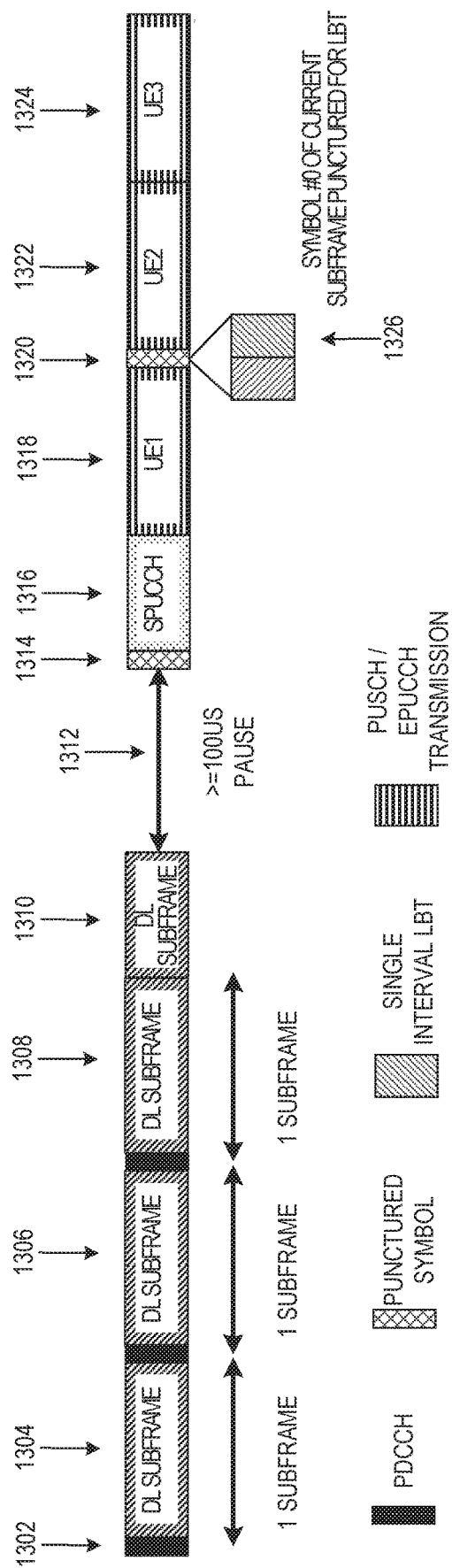
FIG. 13 illustrates example placement of a pause during a Multefire type communication exchange in accordance with some aspects.

FIG. 13 illustrates example placement of a pause during a Multefire type communication exchange in accordance with some aspects. Referring to FIG. 13, there is illustrated an example communication sequence in a MulteFire-based system. Initially, downlink transmissions can be performed and downlink subframes 1304, 1306, 1308, and 1310. One or more physical downlink control channels (PDCCH), such as PDCCH 1302, can precede the downlink subframes. The downlink transmission can be followed by a pause 1312, which can be at least 100 µs. Following the pause 1312, the uplink transmission can include a punctured symbol 1314, a physical uplink control channel (PUCCH) 1316 followed by multiple uplink transmissions (e.g., 1318, 1322, and 1324). The uplink transmissions can be in a physical uplink shared channel (PUSCH) and an extended physical uplink control channel (ePUCCH). One or more of the uplink transmissions 1318, 1322, and 1324 can be preceded by a punctured symbol transmission 1320. The transmission 1320 can include a single interval LBT procedure 1326.

In some aspects, the pause selection can be based on network traffic. For example, an area can be served by an access point (AP) (or several APs) including different traffic types from various equipment (LTE, WiFi, MulteFire, and so forth). In some aspects, a minimum duration of the pause can be configurable based on a variable traffic load.

In some aspects, the traffic load can be measured through an observation window, which can be a fixed time segment. The traffic load (TL) can be estimated by counting the total bits sent or received during the observation window, divided by the length of the observation window (Wt):

TL=(Psize×N)/Wt, where Psize is the packet size and N is the number of packets sent/received during the observation window.

In some aspects, two thresholds can be applied when defining the duration of the pause. More specifically, a higher load threshold Thigh and a lower load threshold Tlow can be used. For example, when the traffic load is higher than Thigh, a shorter pause duration can be selected. In instances when the traffic demand is lower than Tlow, the link is considered to be under loaded and a longer pause duration can be selected.

Figure 14:
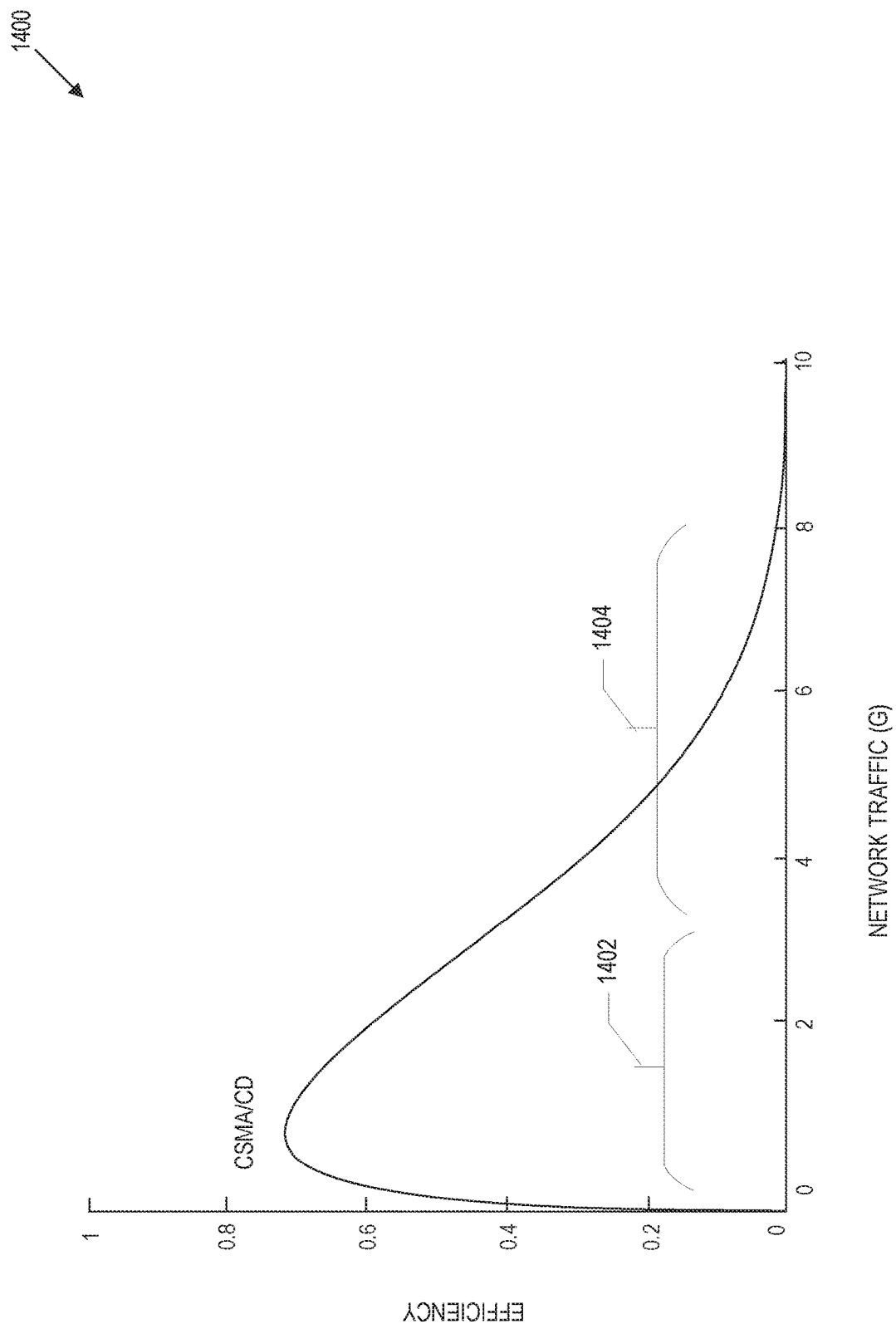
FIG. 14 is an example graph of a carrier sense multiple access with collision detection (CSMA/CD) system efficiency in relation to network traffic in accordance with some aspects.

FIG. 14 is an example graph 1400 of a carrier sense multiple access with collision detection (CSMA/CD) system efficiency in relation to network traffic in accordance with some aspects. Referring to FIG. 14, there is identified a low load working region 1402 and a higher load working region 1404. As seen in FIG. 14, as network traffic increases, the system efficiency decreases. In this regard, the insertion of the pause can be used to take a heavy traffic system back to regions where the system has lower load and higher efficiency. Put another way, adjusting the pause duration can be used to manipulate the system efficiency (pause duration can be increased for high-traffic systems, and decreased for low traffic systems).

In some aspects, VoIP outage increases with high traffic load. In this regard, a pause in non-VOIP CSMA frames can be increased such that the VoIP package drop is reduced and the overall VoIP quality increases.

In some aspects, file transfer can become more efficient in low load scenarios when the pause duration is small. Therefore, in a file transfer communication context, the length of the pause can be reduced in order to increase efficiency.

In some aspects, pause duration can be based on VoIP outage levels. More specifically, the VoIP outage level can be determined (e.g., through decoding of VoIP packages or through interaction with the VoIP nodes (clients/APs)), and set the pause duration to such a level such that VoIP outage is below a maximum threshold (typically Observed VoIP Outage (in %)<VoIP Outage Threshold (in %)).

With a longer pause, VoIP quality of service (QoS) can be improved because the VoIP transmissions can be initiated within the pause. The LBT mechanisms can interpret the pause as being an empty channel and then the medium can become occupied. For 8 ms transmissions, such a scenario means that the remaining part of the frame (after the pause) is lost. In this regard, the longer the pause is, the higher the possibility that the VoIP LBT mechanism can take over the frame.

In some aspects, a pause duration can be selected based on network traffic as well as VoIP outage levels. In this case, the pause duration can be selected so that an optimal level of network traffic and VoIP outage levels is achieved. For this purpose, a Traffic Load (TL) metric and a VoIP Outage related metric (such as VoIP Outage in %=TVoIP) can be determined. In some aspects, the traffic load metric can be weighted with a scalar constant "ktraffic", and the inverse of the VoIP outage related metric can be weighted with a scalar constant "kVoIP", and the weighted metrics can be summed up to generate a new joint metric. In instances when the combined metric is higher than a combined target threshold (typically Tcombined=ktraffic*Thigh+kVoIP/TVoIP) then the pause duration can be reduced, and in the opposite case, the pause duration can be increased.

In some aspects, changes in the pause duration can be done by a sufficiently large value "ΔPause" such that the target metric values can be achieved.

Figure 15:
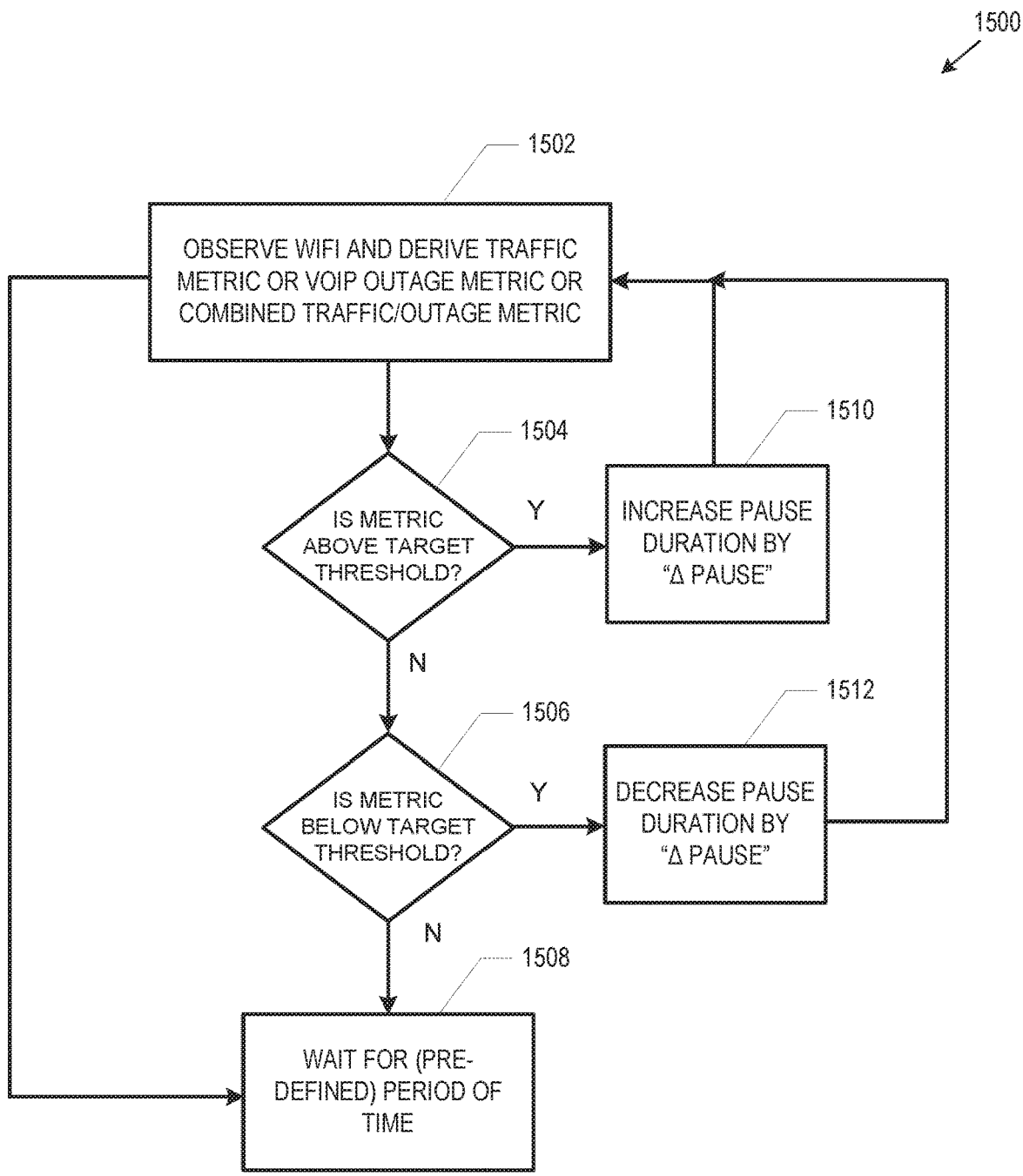
FIG. 15 is a flow diagram illustrating example functionalities for iterative adaptation of a pause duration in accordance with some aspects.

In some aspects, the pause duration can be iteratively (dynamically) adjusted depending on fairness observations, as illustrated in FIG. 15. FIG. 15 is a flow diagram 1500 illustrating example functionalities for iterative adaptation of a pause duration in accordance with some aspects. The technique illustrated in FIG. 15 can be based on one or more of the techniques discussed herein above, however, a smaller "ΔPause" step size (for the pause duration change) is applied such that an iterative process can be achieved. In some aspects, following the application of a new pause duration (e.g., new pause duration can be equal to the previous pause duration+/−ΔPause), new decision metrics can be derived, and a determination can be made on whether the pause duration has to be further adapted. This process can be repeated until a target metric is achieved, at which point the system can remain inactive for a (predefined) period of time. After the period of inactivity has elapsed, a determination can be made again on whether the pause length needs to be modified. An example flow is discussed herein below.

Referring to FIG. 15, at 1502, one or more wireless communication channels (e.g. on a licensed and/or unlicensed band) can be observed to derive network traffic metric, VoIP outage metric, and/or a combined traffic/outage metric. At 1504, it can be determined whether the metric is above a target threshold. If the metric is above the target threshold, at 1510, the pause duration can be increased by a predetermined amount, such as ΔPause, and processing can resume at 1502. Give the metric is not above the target threshold, at 1506, it can be determined whether the metric is below another (second) target threshold. If the metric is below the second threshold, at 1512, the pause duration can be decreased by a value of ΔPause, and processing can resume at 1502. If the metric is not below the second threshold, at 1508, a wait for a predefined period of time can be implemented, and processing can resume at 1502. The final (pre-determined) waiting time at 1508 can also be flexible and may be adapted iteratively. For example, if the related metrics have changed substantially (i.e., more than a predetermined percentage) after the current waiting time, the waiting time at 1508 can be reduced. On the other hand, if the related metric did not change notably, the waiting time at 1508 can be increased.

Figure 16:
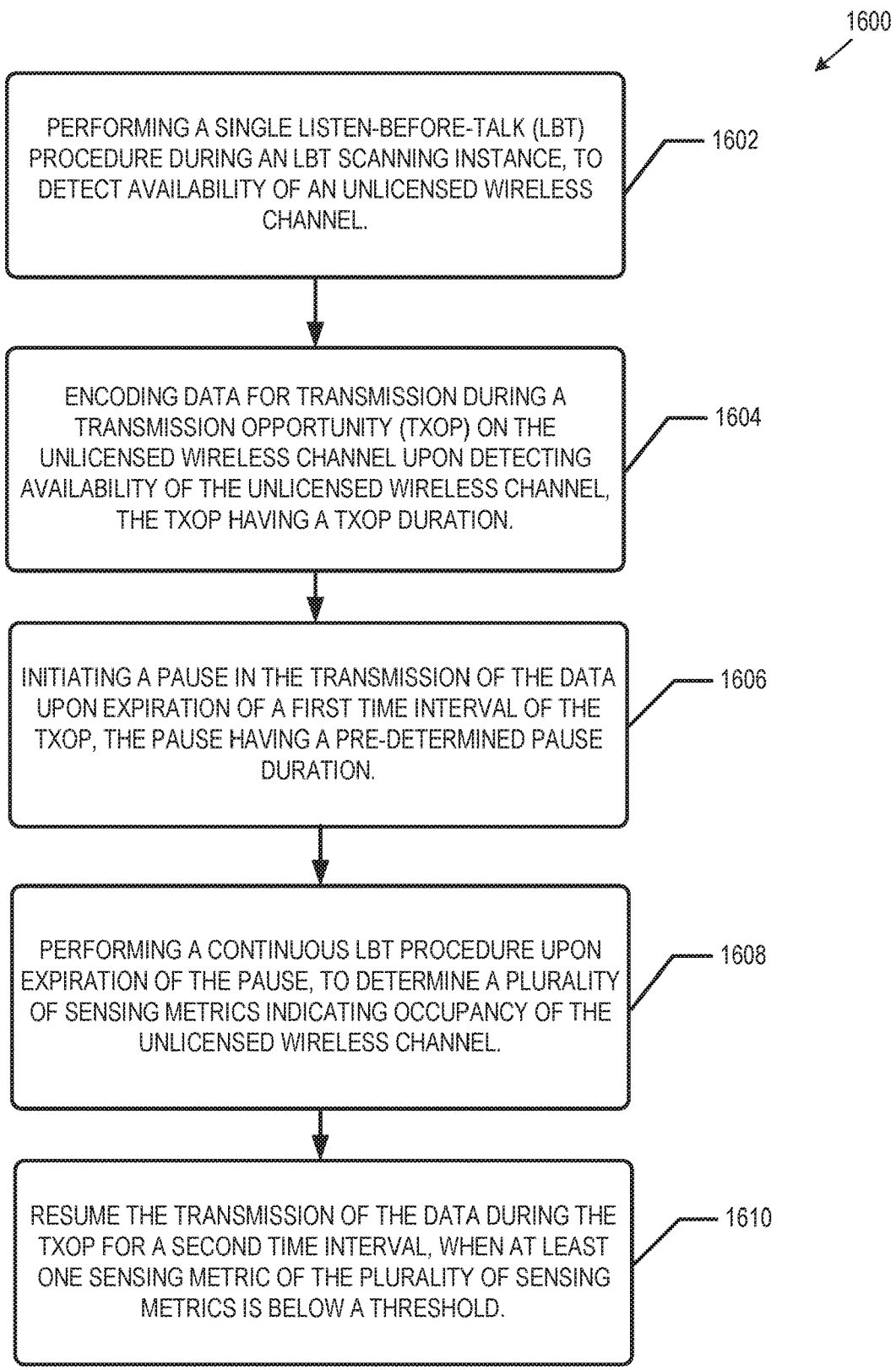
FIG. 16 is a flow diagram illustrating example functionalities for resuming data transmission in a TXOP after a pause and continuous LBT in accordance with some aspects.

FIG. 16 is a flow diagram illustrating example functionalities for resuming data transmission in a TXOP after a pause and continuous LBT in accordance with some aspects. Referring to FIG. 16, the example method 1600 can start at 1602, when a single listen-before-talk (LBT) procedure can be performed during an LBT scanning instance, to detect availability of an unlicensed wireless channel. For example and in reference to FIG. 9, a first wireless device can perform a single LBT prior to transmission 902. At 1604, data can be encoded for transmission during a transmission opportunity (TXOP) on the unlicensed wireless channel upon detecting availability of the unlicensed wireless channel, the TXOP having a TXOP duration. For example, after the first wireless device has detected availability of the wireless channel during the single LBT, the first wireless device can initiate a transmission 902 during a TXOP.

At 1606, a pause can be initiated in the transmission of the data upon expiration of a first time interval of the TXOP, the pause having a pre-determined pause duration. For example, a pause 904 can be initiated after a first portion 902 of the TXOP has been transmitted. The pause 904 can have a predetermined duration, e.g., as described herein above.

At 1608, a continuous LBT procedure can be performed upon expiration of the pause, to determine a plurality of sensing metrics indicating occupancy of the unlicensed wireless channel. For example, the first wireless device can perform a continuous LBT after the expiration of the pause 904. At 1610, the transmission of the data can be resumed during the TXOP for a second time interval, when at least one sensing metric of the plurality of sensing metrics is below a threshold. For example, when sensing metrics obtained during the continuous LBT indicate channel availability, data transmission can be resumed for a remaining portion 908 of the TXOP.

Figure 17:
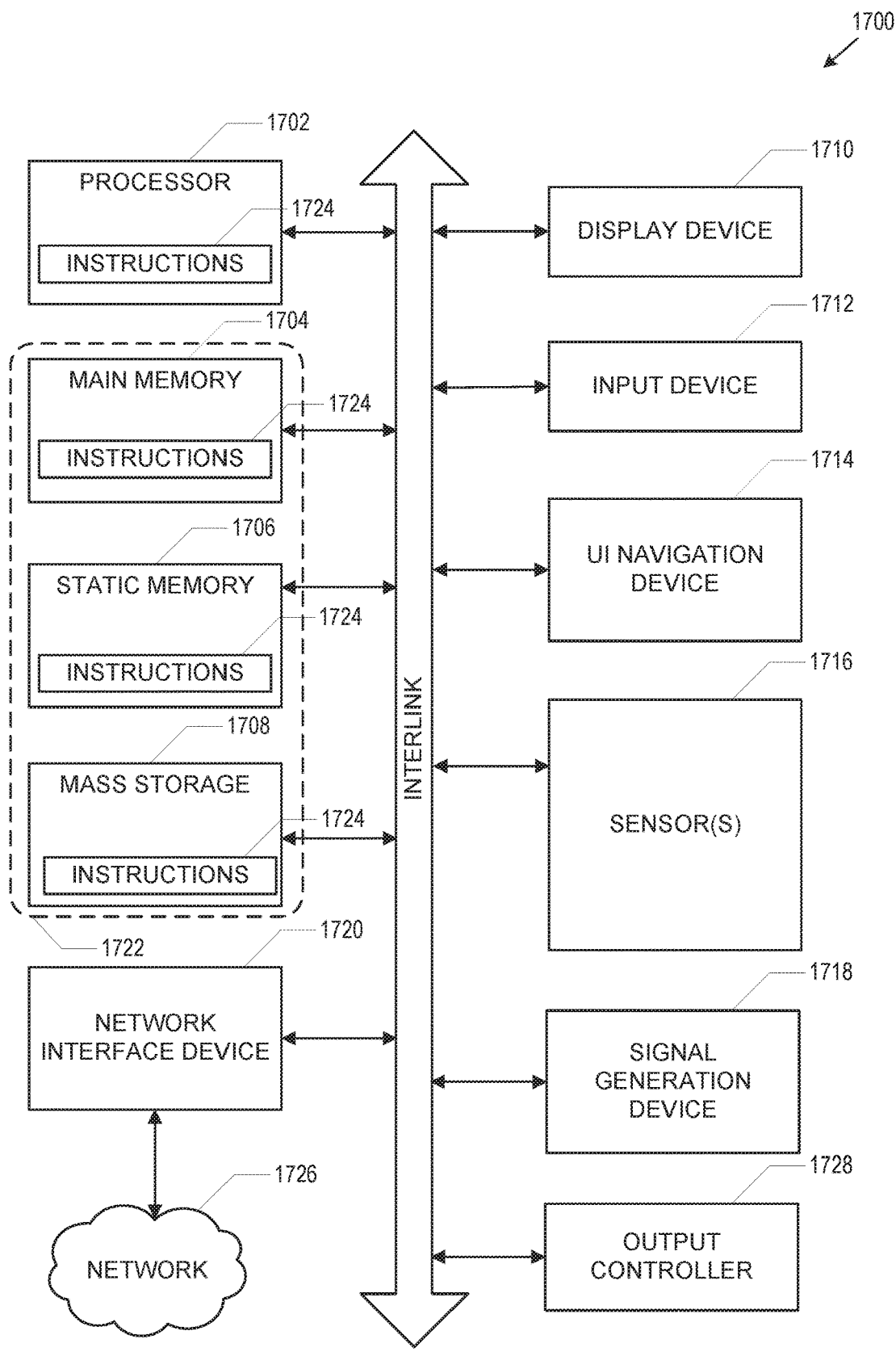
FIG. 17 illustrates a block diagram of a communication device such as an evolved Node-B (eNB), a new generation Node-B (gNB), an access point (AP), a wireless station (STA), or a user equipment (UE), in accordance with some aspects.

FIG. 17 illustrates a block diagram of a communication device such as an evolved Node-B (eNB), a new generation Node-B (gNB), an access point (AP), a wireless station (STA), or a user equipment (UE), in accordance with some aspects. In alternative aspects, the communication device 1700 may operate as a standalone device or may be connected (e.g., networked) to other communication devices. In a networked deployment, the communication device 1700 may operate in the capacity of a server communication device, a client communication device, or both in server-client network environments. In an example, the communication device 1700 may act as a peer communication device in peer-to-peer (P2P) (or other distributed) network environment. The communication device 1700 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The communication device 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The communication device 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The communication device 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a communication device readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the communication device 1700. In an example, one or any combination of the hardware processor 1702, the main memory 1704, the static memory 1706, or the storage device 1716 may constitute communication device readable media.

While the communication device readable medium 1722 is illustrated as a single medium, the term "communication device readable medium" may include a single medium or multiple media (e.g., a centralized or distributed database, and/or associated caches and servers) configured to store the one or more instructions 1724.

The term "communication device readable medium" may include any medium that is capable of storing, encoding, or carrying instructions for execution by the communication device 1700 and that cause the communication device 1700 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks, Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), MIMO, or multiple-input single-output (MISO) techniques. In some examples, the network interface device 1720 may wirelessly communicate using Multiple User MIMO techniques. The term "transmission medium" shall be taken to include any intangible medium that is capable of storing, encoding or carrying instructions for execution by the communication device 1700, and includes digital or analog communications signals or other intangible medium to facilitate communication of such software.

Additional Notes and Examples

Example 1 is an apparatus of a user equipment (UE), the apparatus comprising: processing circuitry, the processing circuitry configured to: perform a single listen-before-talk (LBT) procedure during an LBT scanning instance, to detect availability of an unlicensed wireless channel; upon detecting availability of the unlicensed wireless channel, encode data for transmission during a transmission opportunity (TXOP) on the unlicensed wireless channel, the TXOP having a TXOP duration; initiate a pause in the transmission of the data upon expiration of a first time interval of the TXOP, the pause having a pre-determined pause duration; perform a continuous LBT procedure upon expiration of the pause, to determine a plurality of sensing metrics indicating occupancy of the unlicensed wireless channel, wherein the continuous LBT procedure is performed while the wireless channel is occupied; and resume the transmission of the data during the TXOP for a second time interval, when the TXOP is unexpired and at least one sensing metric of the plurality of sensing metrics is below a threshold, indicating that the wireless channel is no longer occupied; and memory coupled to the processing circuitry, the memory configured to store the threshold.

In Example 2, the subject matter of Example 1 includes, wherein to perform the single LBT procedure, the processing circuitry is configured to: determine during the LBT scanning instance, a single sensing metric for the unlicensed wireless channel; and determine the unlicensed wireless channel is available based on the single sensing metric.

In Example 3, the subject matter of Examples 1-2 includes, wherein the plurality of sensing metrics include one or both of a receive signal strength indicator (RSSI) and a cyclic prefix (CP) auto correlation metric.

In Example 4, the subject matter of Examples 1-3 includes, wherein to perform the continuous LBT procedure, the processing circuitry is configured to: determine the plurality of sensing metrics for the unlicensed wireless channel during a corresponding plurality of LBT scanning instances; and resume the transmission of the data during the TXOP when one of the plurality of sensing metrics is below the threshold.

In Example 5, the subject matter of Example 4 includes, wherein the plurality of LBT scanning instances are equally spaced.

In Example 6, the subject matter of Examples 4-5 includes, wherein the plurality of LBT scanning instances are unequally spaced.

In Example 7, the subject matter of Examples 1-6 includes, wherein to perform the continuous LBT procedure, the processing circuitry is configured to: determine the plurality of sensing metrics for the unlicensed wireless channel during a single LBT scanning instance; determine the occupancy for the unlicensed wireless channel using a combined sensing metric associated with a sliding time window within the single LBT scanning instance, the combined sensing metric based on one or more of the plurality of sensing metrics determined during the sliding time window; and resume the transmission of the data during the TXOP when the combined sensing metric is below the threshold.

In Example 8, the subject matter of Examples 1-7 includes, wherein the pre-determined pause duration is at least 100 microseconds (s).

In Example 9, the subject matter of Examples 1-8 includes, wherein the TXOP duration is at least 8 milliseconds (ms).

In Example 10, the subject matter of Examples 1-9 includes, wherein the first time interval is smaller than or equal to 6 ms.

In Example 11, the subject matter of Examples 1-10 includes, wherein the TXOP duration comprises the first time interval and the second time interval.

In Example 12, the subject matter of Examples 1-11 includes, transceiver circuitry coupled to the processing circuitry; and, one or more antennas coupled to the transceiver circuitry.

In Example 13, the subject matter of Examples 1-12 includes, wherein the processing circuitry is configured to: measure data traffic load associated with the unlicensed wireless channel during an observation time window, based on a number of bits communicated within the observation time window.

In Example 14, the subject matter of Example 13 includes, wherein the processing circuitry is configured to: set the pause duration to a first duration when the data traffic load is higher than a first threshold value; and set the pause duration to a second duration when the data traffic load is lower than a second threshold value.

In Example 15, the subject matter of Example 14 includes, wherein the first duration of the pause is shorter than the second duration.

In Example 16, the subject matter of Examples 13-15 includes, wherein the processing circuitry is configured to: detect an outage level associated with voice-over-Internet-protocol (VoIP) transmissions on the wireless channel; and set the pause duration based on the detected outage level of the VoIP transmissions being smaller than a VoIP outage threshold.

In Example 17, the subject matter of Examples 1-16 includes, wherein the processing circuitry is configured to: measure data traffic load associated with the wireless channel during an observation time window, based on a number of bits communicated within the observation time window; detect an outage level associated with voice-over-Internet-protocol (VoIP) transmissions on the wireless channel; and set the pause duration based on the detected outage level of the VoIP transmissions and the measured data traffic load.

In Example 18, the subject matter of Example 17 includes, wherein the processing circuitry is configured to: dynamically adjust the pause duration based on continuous measurements of one or both of the data traffic load and the VoIP transmissions outage levels.

Example 19 is a non-transitory computer-readable storage medium that stores instructions for execution by one or more processors of a user equipment (UE), the instructions to configure the one or more processors to cause the UE to: encode data for transmission on an unlicensed wireless channel during a transmission opportunity (TXOP), the TXOP having a TXOP duration; initiate a pause in the transmission of the data upon expiration of a time interval of the TXOP duration; perform a continuous listen-before-talk (LBT) procedure upon expiration of the pause, to determine at least one sensing metric, the at least one sensing metric indicative of channel occupancy of the unlicensed wireless channel; and resume the transmission of the data for a remainder of the TXOP duration, when the at least one sensing metric indicates the unlicensed wireless channel is unoccupied.

In Example 20, the subject matter of Example 19 includes, wherein the one or more processors further cause the apparatus of the wireless device to: perform an initial LBT procedure during a single LBT scanning instance to detect availability of the unlicensed wireless channel prior to the data transmission.

In Example 21, the subject matter of Examples 19-20 includes, wherein the at least one sensing metric includes a receive signal strength indicator (RSSI) or a cyclic prefix (CP) auto correlation metric.

In Example 22, the subject matter of Examples 19-21 includes, wherein during the continuous LBT procedure, the one or more processors further cause the UE to: allocate a plurality of independent LBT scanning instances; generate the at least one sensing metric for an LBT scanning instance of the plurality of independent LBT scanning instances; upon expiration of the LBT scanning instance, determine channel occupancy of the unlicensed wireless channel based on the at least one sensing metric; and resume the transmission of the data during the TXOP when the at least one sensing metric indicates the unlicensed wireless channel is unoccupied.

In Example 23, the subject matter of Example 22 includes, wherein during the continuous LBT procedure, the one or more processors further cause the UE to: upon determining the unlicensed wireless channel is occupied based on the at least one sensing metric, generate at least another sensing metric during a subsequent LBT scanning instance of the plurality of LBT instances; upon expiration of the subsequent LBT scanning instance, determine channel occupancy of the unlicensed wireless channel based on the at least another sensing metric; and resume the transmission of the data during the TXOP when the at least another sensing metric indicates the unlicensed wireless channel is unoccupied.

In Example 24, the subject matter of Examples 19-23 includes, wherein during the continuous LBT procedure, the one or more processors further cause the UE to: determine a plurality of sensing metrics for the wireless channel during a single LBT scanning instance; determine the occupancy for the wireless channel using a combined sensing metric associated with a sliding time window within the single LBT scanning instance, the combined sensing metric based on one or more of the plurality of sensing metrics determined during the sliding time window; and resume the transmission of the data during the TXOP when the combined sensing metric indicates the channel is unoccupied.

Example 25 is an apparatus of a Node-B (NB), the apparatus comprising: memory; and processing circuitry, configured to: measure data traffic load associated with an unlicensed wireless channel during an observation time window, based on a number of bits communicated within the observation time window; upon detecting availability of the unlicensed wireless channel, encode data for transmission during a transmission opportunity (TXOP) having a TXOP duration; initiate a pause in the transmission of the data upon expiration of a first time interval of the TXOP, the pause having a pause duration based on the data traffic load; perform a continuous LBT procedure upon expiration of the pause, to determine a plurality of sensing metrics indicating occupancy of the unlicensed wireless channel; and resume the transmission of the data during the TXOP for a second time interval, when at least one sensing metric of the plurality of sensing metrics is below a threshold.

In Example 26, the subject matter of Example 25 includes, wherein the processing circuitry is configured to: set the pause duration to a first duration when the data traffic load is higher than a first traffic load threshold value; and set the pause duration to a second duration when the data traffic load is lower than a second traffic load threshold value.

In Example 27, the subject matter of Example 26 includes, wherein the first duration of the pause is shorter than the second duration.

In Example 28, the subject matter of Examples 25-27 includes, wherein the processing circuitry is configured to: detect an outage level associated with voice-over-Internet-protocol (VoIP) transmissions on the unlicensed wireless channel; and set the pause duration based on the detected outage level of the VoIP transmissions being smaller than a VoIP outage threshold.

In Example 29, the subject matter of Examples 25-28 includes, wherein the processing circuitry is configured to: measure the data traffic load associated with the unlicensed wireless channel during an observation time window, based on a number of bits communicated within the observation time window; detect an outage level associated with voiceover-Internet-protocol (VoIP) transmissions on the unlicensed wireless channel; and set the pause duration based on the detected outage level of the VoIP transmissions and the measured data traffic load.

In Example 30, the subject matter of Examples 25-29 includes, wherein to perform the continuous LBT procedure, the processing circuitry is configured to: determine the plurality of sensing metrics for the unlicensed wireless channel during a corresponding plurality of LBT scanning instances; and resume the transmission of the data during the TXOP when one of the plurality of sensing metrics is below the threshold.

In Example 31, the subject matter of Examples 25-30 includes, wherein to perform the continuous LBT procedure, the processing circuitry is configured to: determine the plurality of sensing metrics for the unlicensed wireless channel during a single LBT scanning instance; determine the occupancy for the unlicensed wireless channel using a combined sensing metric associated with a sliding time window within the single LBT scanning instance, the combined sensing metric based on one or more of the plurality of sensing metrics determined during the sliding time window; and resume the transmission of the data during the TXOP when the combined sensing metric is below the threshold.

In Example 32, the subject matter of Examples 25-31 includes, wherein the plurality of sensing metrics include one or both of a receive signal strength indicator (RSSI) and a cyclic prefix (CP) auto correlation metric.

In Example 33, the subject matter of Examples 25-32 includes, wherein the NB is one of a Next Generation Node-B (gNB) or an Evolved Node-B (eNB).

Example 34 is an apparatus of a user equipment (UE), the apparatus comprising: means for encoding data for transmission on an unlicensed wireless channel during a transmission opportunity (TXOP), the TXOP having a TXOP duration; means for initiating a pause in the transmission of the data upon expiration of a time interval of the TXOP duration; means for performing a continuous listen-before-talk (LBT) procedure upon expiration of the pause, to determine at least one sensing metric, the at least one sensing metric indicative of channel occupancy of the unlicensed wireless channel; and means for resuming the transmission of the data for a remainder of the TXOP duration, when the at least one sensing metric indicates the unlicensed wireless channel is unoccupied.

In Example 35, the subject matter of Example 34 includes, wherein the apparatus further comprises: means for performing an initial LBT procedure during a single LBT scanning instance to detect availability of the unlicensed wireless channel prior to the data transmission.

In Example 36, the subject matter of Examples 34-35 includes, wherein the at least one sensing metric includes a receive signal strength indicator (RSSI) or a cyclic prefix (CP) auto correlation metric.

In Example 37, the subject matter of Examples 34-36 includes, wherein the apparatus further comprises: means for allocating a plurality of independent LBT scanning instances during the continuous LBT procedure; means for generating the at least one sensing metric for an LBT scanning instance of the plurality of independent LBT scanning instances; means for determining channel occupancy of the unlicensed wireless channel based on the at least one sensing metric, upon expiration of the LBT scanning instance; and means for resuming the transmission of the data during the TXOP when the at least one sensing metric indicates the unlicensed wireless channel is unoccupied.

Example 38 is at least one machine-readable medium including instructions that, when executed by processing circuitry, cause the processing circuitry to perform operations to implement of any of Examples 1-37.

Example 39 is an apparatus comprising means to implement of any of Examples 1-37.

Example 40 is a system to implement of any of Examples 1-37.

Example 41 is a method to implement of any of Examples 1-37.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:
1. An apparatus comprising:
processing circuitry configured to cause a user equipment (UE) to:
perform a single listen-before-talk WIT) procedure during an LBT scanning instance, to detect availability of an unlicensed wireless channel;

upon detecting availability of the unlicensed wireless channel, encode data for transmission during a transmission opportunity (TXOP) on the unlicensed wireless channel, the TXOP having a TXOP duration;

initiate a pause in the transmission of the data upon expiration of a first time interval of the TXOP, the pause having a minimum pause duration;

perform continuous sensing during and upon expiration of the pause, to determine one or more sensing metrics indicating occupancy of the unlicensed wireless channel, wherein the continuous sensing is performed while the unlicensed wireless channel is occupied; and resume the transmission of the data during the TXOP for a second time interval, when the TXOP is unexpired and at least one sensing metric of the one or more sensing metrics is below a threshold, indicating that the unlicensed wireless channel is no longer occupied.

2. The apparatus of claim 1, wherein, to perform the single LBT procedure, the processing circuitry is configured to:
determine during the LBT scanning instance, a single sensing metric for the unlicensed wireless channel; and
determine the unlicensed wireless channel is available based on the single sensing metric.

3. The apparatus of claim 1, wherein the one or more sensing metrics include one or both of a receive signal strength indicator (RSSI) and a cyclic prefix (CP) auto correlation metric.

4. The apparatus of claim 1, wherein said one or more sensing metrics are determined during a plurality of LBT scanning instances.

5. The apparatus of claim 4, wherein the plurality of LBT scanning instances are equally spaced.

6. The apparatus of claim 4, wherein the plurality of LBT scanning instances are unequally spaced.

7. The apparatus of claim 1, wherein the one or more sensing metrics include a plurality of sensing metrics, wherein, to perform the continuous sensing, the processing circuitry is configured to:
determine the plurality of sensing metrics for the unlicensed wireless channel during a single LBT scanning instance;
determine the occupancy for the unlicensed wireless channel using a combined sensing metric associated with a sliding time window within the single LBT scanning instance, the combined sensing metric being based on a combination of two or more of the plurality of sensing metrics determined during the sliding time window;
wherein said resuming the transmission of the data during the TXOP occurs when the combined sensing metric is below the threshold.

8. The apparatus of claim 1, wherein the minimum pause duration is at least 100 microseconds (μs).

9. The apparatus of claim 1, wherein the TXOP duration is at least 8 milliseconds (ms).

10. The apparatus of claim 1, wherein the first time interval is smaller than or equal to 6 ms.

11. The apparatus of claim 1, further comprising:
transceiver circuitry coupled to the processing circuitry; and
one or more antennas coupled to the transceiver circuitry.

12. The apparatus of claim 1, wherein the processing circuitry is configured to:

measure data traffic load associated with the unlicensed wireless channel during an observation time window, based on a number of bits communicated within the observation time window.

13. The apparatus of claim 12, wherein the processing circuitry is configured to:
set the minimum pause duration to a first duration when the data traffic load is higher than a first threshold value; and
set the minimum pause duration to a second duration when the data traffic load is lower than a second threshold value.

14. The apparatus of claim 13, wherein the first duration is smaller than the second duration.

15. The apparatus of claim 12, wherein the processing circuitry is configured to:
detect an outage level associated with voice-over-Internet-protocol (VoIP) transmissions on the unlicensed wireless channel; and
set the minimum pause duration based on the detected outage level of the VoIP transmissions being smaller than a VoIP outage threshold.

16. The apparatus of claim 1, wherein the processing circuitry is configured to:
measure data traffic load associated with the unlicensed wireless channel during an observation time window, based on a number of bits communicated within the observation time window;
detect an outage level associated with voice-over-Internet-protocol (VoIP) transmissions on the unlicensed wireless channel; and
set the minimum pause duration based on the detected outage level of the VoIP transmissions and the measured data traffic load.

17. The apparatus of claim 16, wherein the processing circuitry is configured to:
dynamically adjust the minimum pause duration based on continuous measurements of one or both of the data traffic load and the VoIP transmissions outage levels.

18. The apparatus of claim 1, further comprising:
memory coupled to the processing circuitry, and configured to store the threshold.

19. A non-transitory computer-readable storage medium that stores instructions, wherein the instructions, when executed by one or more processors, cause a user equipment (UE) to:
encode data for transmission on an unlicensed wireless channel during a transmission opportunity (TXOP), the TXOP having a TXOP duration;
initiate a pause in the transmission of the data upon expiration of a time interval of the TXOP duration;
perform continuous sensing upon expiration of the pause, to determine at least one sensing metric, the at least one sensing metric indicative of channel occupancy of the unlicensed wireless channel; and
resume the transmission of the data for a remainder of the TXOP duration, when the at least one sensing metric indicates the unlicensed wireless channel is unoccupied.

20. The non-transitory computer-readable storage medium of claim 19, wherein the instructions, when executed by the one or more processors, further cause the UE to:
perform an initial LBT procedure during a single LBT scanning instance to detect availability of the unlicensed wireless channel prior to the data transmission.

21. The non-transitory computer-readable storage medium of claim 19, wherein the at least one sensing metric includes a receive signal strength indicator (RSSI) or a cyclic prefix (CP) auto correlation metric.

22. The non-transitory computer-readable storage medium of claim 19, wherein the instructions, when executed by the one or more processors, further cause the UE to:
during the continuous sensing;
allocate a plurality of independent LBT scanning instances;
generate the at least one sensing metric for an LBT scanning instance of the plurality of independent LBT scanning instances;
upon expiration of the LBT scanning instance, determine channel occupancy of the unlicensed wireless channel based on the at least one sensing metric; and
resume the transmission of the data during the TXOP when the at least one sensing metric indicates the unlicensed wireless channel is unoccupied.

23. An apparatus comprising
processing circuitry, configured to cause a base station to:
measure data traffic load associated with an unlicensed wireless channel during an observation time window, wherein said measuring the data traffic load is based on a number of bits communicated within the observation time window;
upon detecting availability of the unlicensed wireless channel, encode data for transmission during a transmission opportunity (TXOP) having a TXOP duration;
initiate a pause in the transmission of the data upon expiration of a first time interval of the TROP, the pause having a minimum pause duration based on the data traffic load;
perform continuous sensing during and upon expiration of the pause, to determine one or more sensing metrics indicating occupancy of the unlicensed wireless channel; and
resume the transmission of the data during the TXOP for a second time interval, when at least one sensing metric of the one or more sensing metrics is below a threshold.

24. The apparatus of claim 23, wherein the processing circuitry is further configured to cause the base station to:
set the minimum pause duration to a first duration when the data traffic load is higher than a first traffic load threshold value; and
set the minimum pause duration to a second duration when the data traffic load is lower than a second traffic load threshold value.

25. The apparatus of claim 24, wherein the first duration is smaller than the second duration.

* * * * *